(12) United States Patent
Tsirtsis et al.

(10) Patent No.: US 8,782,278 B2
(45) Date of Patent: Jul. 15, 2014

(54) ADDRESS REDIRECTION FOR NODES WITH MULTIPLE INTERNET PROTOCOL ADDRESSES IN A WIRELESS NETWORK

(75) Inventors: Georgios Tsirtsis, London (GB); Gerardo Giaretta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 518 days.

(21) Appl. No.: 12/405,902

(22) Filed: Mar. 17, 2009

(65) Prior Publication Data

US 2009/0240795 A1 Sep. 24, 2009

Related U.S. Application Data

(60) Provisional application No. 61/038,514, filed on Mar. 21, 2008.

(51) Int. Cl.
*G06F 15/16* (2006.01)
*H04L 29/12* (2006.01)
*H04W 8/26* (2009.01)
*H04W 80/04* (2009.01)

(52) U.S. Cl.
CPC .......... *H04L 61/1511* (2013.01); *H04W 80/04* (2013.01); *H04L 29/12358* (2013.01); *H04L 61/251* (2013.01); *H04W 8/26* (2013.01); *H04L 29/12066* (2013.01); *H04L 61/6077* (2013.01); *H04L 29/12952* (2013.01)
USPC .......................................... 709/245; 709/223

(58) Field of Classification Search
None
See application file for complete search history.

(56) References Cited

U.S. PATENT DOCUMENTS

| | | | |
|---|---|---|---|
| 6,614,774 B1 | 9/2003 | Wang | |
| 6,917,612 B2 * | 7/2005 | Foti et al. | 370/352 |
| 7,047,288 B2 * | 5/2006 | Cooper et al. | 709/223 |
| 7,272,646 B2 * | 9/2007 | Cooper et al. | 709/223 |
| 7,308,237 B2 * | 12/2007 | Kokkonen et al. | 455/185.1 |
| 7,315,543 B2 * | 1/2008 | Takeuchi et al. | 370/392 |
| 7,373,426 B2 * | 5/2008 | Jinmei et al. | 709/245 |
| 7,529,852 B2 * | 5/2009 | Satapati | 709/245 |
| 7,593,364 B2 * | 9/2009 | Asthana | 370/328 |
| 7,684,392 B2 * | 3/2010 | Saito et al. | 370/389 |

(Continued)

FOREIGN PATENT DOCUMENTS

| | | |
|---|---|---|
| CN | 1450478 A | 10/2003 |
| JP | 2003298618 A | 10/2003 |
| WO | 2007051387 A1 | 5/2007 |

OTHER PUBLICATIONS

3GPP TS 23.402 V8.0.0 (Dec. 2007), Technical Specification, Release 8.*

(Continued)

*Primary Examiner* — Backhean Tiv

(57) ABSTRACT

Systems and methodologies are described that facilitate obtaining an Internet Protocol (IP) address of a node with multiple IP addresses using address redirection in a wireless communication environment. A wireless communication component can retrieve a previously registered IP address corresponding to the node from an Authentication, Accounting, and Authorization/Home Subscriber Server (AAA/HSS). Further, a reverse query of a Domain Name Server (DNS) and a forward query of the DNS can be performed. The reverse query can be constructed based upon the previously registered IP address of the node and can resolve a name (e.g., string, . . . ). Further, the forward query can be formed based upon the name and can return a differing IP address of the node.

27 Claims, 10 Drawing Sheets

(56) References Cited

U.S. PATENT DOCUMENTS

| | | | |
|---|---|---|---|
| 7,693,165 B2* | 4/2010 | Xu | 370/401 |
| 7,797,410 B2* | 9/2010 | Westerdal | 709/223 |
| 7,818,453 B2* | 10/2010 | Haumont et al. | 709/245 |
| 7,864,709 B2* | 1/2011 | Cheshire | 370/255 |
| 7,864,780 B1* | 1/2011 | Satapati | 370/395.54 |
| 7,873,003 B2* | 1/2011 | Baek et al. | 370/329 |
| 7,907,295 B2* | 3/2011 | Ono | 358/1.15 |
| 2004/0228343 A1* | 11/2004 | Molteni et al. | 370/392 |
| 2004/0233916 A1* | 11/2004 | Takeuchi et al. | 370/395.54 |
| 2005/0076139 A1* | 4/2005 | Jinmei et al. | 709/245 |
| 2005/0267978 A1* | 12/2005 | Satapati | 709/230 |
| 2006/0123470 A1* | 6/2006 | Chen | 726/5 |
| 2006/0159108 A1* | 7/2006 | Chan | 370/401 |
| 2007/0051387 A1* | 3/2007 | Hwang et al. | 134/1.1 |
| 2008/0089293 A1* | 4/2008 | Madour et al. | 370/331 |
| 2008/0275995 A1* | 11/2008 | Soliman et al. | 709/230 |
| 2009/0240795 A1* | 9/2009 | Tsirtsis et al. | 709/223 |
| 2009/0254658 A1* | 10/2009 | Kamikura et al. | 709/225 |
| 2010/0265846 A1* | 10/2010 | Weniger | 370/254 |

OTHER PUBLICATIONS

3GPP: "3rd Generation Partnership Project;Technical Specification Group Services and System Aspects;Mobility between 3GPP-Wireless Local Area Network(WLAN) Interworking and 3GPP Systems(Release 8)" 3GPP DRAFT; TS23.327V0.2.1—Marked Changes, 3rd Generation Partnership Project (3GPP), Mobile Competence Centre ; 650, Route Des Lucioles ; F-06921 Sophia-Antipolis Cedex ;,France, vol. SA WG2, No. Jeju; 20080407, Feb. 1, 2008, XP50265384 The whole document.

Ericsson: "GGSN selection for combined GGSN/HA" 3GPP DRAFT; S2-083607_23.327_Combo_$_{L\ GGSN\text{-}HA}$_Selection, 3rd Generation Partnership Project (3GPP), Mobile Competence Centre ; 650, Route Des Lucioles ; F-06921 Sophia-Antipolis Cedex ; France. vol. SA WG2, No. Prague; 20080512, May 7, 2008, XP050265810 the whole document.

Fei Yu et al: "A new method to support UMTS/WLAN vertical handover using SCTP" IEEE Wireless Communications, IEEE Service Center, Piscataway, NJ, US, vol. 11, No. 4, Aug. 1, 2004, pp. 44-51, XP011117201 ISSN: 1536-1284 the whole document.

International Search Report & Written Opinion—PCT/US2009/037882, International Search Authority—European Patent Office—Jul. 23, 2009.

Mockapetris Isi P: "Domain Names—Implementation and Specification; rfc1035.txt" IETF Standard, Internet Engineering Task Force, IETF, CH, Nov. 1, 1987, XP015005974 ISSN: 0000-0003 p. 22-p.23.

3GPP "Technical Specification Group Services and Systems Aspects, Network Architecture", (Release 8), 3GPP TS 23.002 V8.2.0, Dec. 2007.

Taiwan Search Report—TW098109264—TIPO—Jan. 7, 2013.

* cited by examiner

ADDRESS REDIRECTION FOR NODES WITH MULTIPLE INTERNET PROTOCOL ADDRESSES IN A WIRELESS NETWORK

CLAIM OF PRIORITY UNDER 35 U.S.C. §119

The present Application for Patent claims priority to Provisional Application No. 61/038,514 entitled "METHOD AND SYSTEM TO ENABLE ADDRESS REDIRECTION FOR NODES WITH MULTIPLE INTERNET PROTOCOL ADDRESSES IN A WIRELESS NETWORK" filed Mar. 21, 2008, and assigned to the assignee hereof and hereby expressly incorporated by reference herein.

BACKGROUND

1. Field

The following description relates generally to wireless communications, and more particularly to discovery of an Internet Protocol (IP) address corresponding to a function for a node, where the node is associated with a plurality of Internet Protocol addresses, in a wireless communication environment.

2. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Base stations can further communicate directly or indirectly with various nodes of a core network. For instance, the nodes of the core network can include one or more Packet Data Network Gateways (PDN GWs), one or more Serving Gateways (SGWs), one or more Mobility Management Entities (MMEs), one or more Authentication, Accounting and Authorization/Home Subscriber Servers (AAA/HSSs), and so forth.

In some scenarios, certain nodes (e.g. PDN GW, . . . ) within a core network can use multiple Internet Protocol (IP) addresses. Each of the multiple IP addresses corresponding to a given node (e.g., PDN GW, . . . ) can be used by/for a different function or set of functions supported by the given node. Accordingly, an external entity (e.g., disparate node, component, gateway, MME, . . . ) attempting to communication with the given node may know one IP address pertaining to a particular function, but can be unaware of one or more disparate IP addresses associated with the given node, where the one or more disparate IP addresses can respectively correspond to one or more differing functions.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with obtaining an Internet Protocol (IP) address of a node with multiple IP addresses using address redirection in a wireless communication environment. A wireless communication component can retrieve a previously registered IP address corresponding to the node from an Authentication, Accounting, and Authorization/Home Subscriber Server (AAA/HSS). Further, a reverse query of a Domain Name Server (DNS) and a forward query of the DNS can be performed. The reverse query can be constructed based upon the previously registered IP address of the node and can resolve a name (e.g., string, . . . ). Further, the forward query can be formed based upon the name and can return a differing IP address of the node.

According to related aspects, a method is described herein. The method can include retrieving a previously registered Internet Protocol (IP) address for a node from an Authentication, Accounting, and Authorization/Home Subscriber Server (AAA/HSS), the previously registered IP address utilized for a first function. Further, the method can include performing a reverse query of a Domain Name Server (DNS) constructed based upon the previously registered IP address for the node, the reverse query resolves a name. Moreover, the method can comprise receiving a disparate IP address for the node in response to a forward query of the DNS formed based upon the name, the disparate IP address employed for a second function.

Another aspect relates to a wireless communications apparatus. The wireless communications apparatus can include at least one processor. The at least one processor can be configured to construct a reverse query based upon a stored Internet Protocol (IP) address corresponding to a node in a wireless communication network, the stored IP address retained at an Authentication, Accounting, and Authorization/Home Subscriber Server (AAA/HSS). Further, the at least one processor can be configured to send the reverse query to a Domain Name Server (DNS) to resolve a name. Moreover, the at least one processor can be configured to generate a forward query based upon the name. The at least one processor can additionally be configured to transmit the forward query to the DNS to resolve a differing IP address corresponding to the node.

Yet another aspect relates to a wireless communications apparatus. The wireless communications apparatus can include means for obtaining a string in response to a reverse query of a Domain Name Server (DNS) formed based upon a retrieved Internet Protocol (IP) address of a node. Moreover, the wireless communications apparatus can include means for receiving a disparate IP address of the node in response to a forward query of the DNS formed based upon the string.

Still another aspect relates to a computer program product that can comprise a computer-readable medium. The computer-readable medium can include code for causing at least one computer to collect a previously registered Internet Protocol (IP) address for a node from an Authentication, Accounting, and Authorization/Home Subscriber Server (AAA/HSS), the previously registered IP address utilized for a first function. Further, the computer-readable medium can include code for causing at least one computer to send a reverse query formed as a function of the previously registered IP address to a Domain Name Server (DNS) to resolve a name. Moreover, the computer-readable medium can comprise code for causing at least one computer to transmit a forward query formed as a function of the name to the DNS to resolve a differing IP address used for a second function.

Yet another aspect relates to an apparatus that can include an address retrieval component that collects a registered Internet Protocol (IP) address corresponding to a network node from an Authentication, Accounting, and Authorization/ Home Subscriber Server (AAA/HSS). The apparatus can further include an address query component that queries a Domain Name Server (DNS) using the registered IP address as an input to yield a differing IP address corresponding to the network node. Moreover, the apparatus can include a registration component that updates the AAA/HSS to include the differing IP address for the network node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
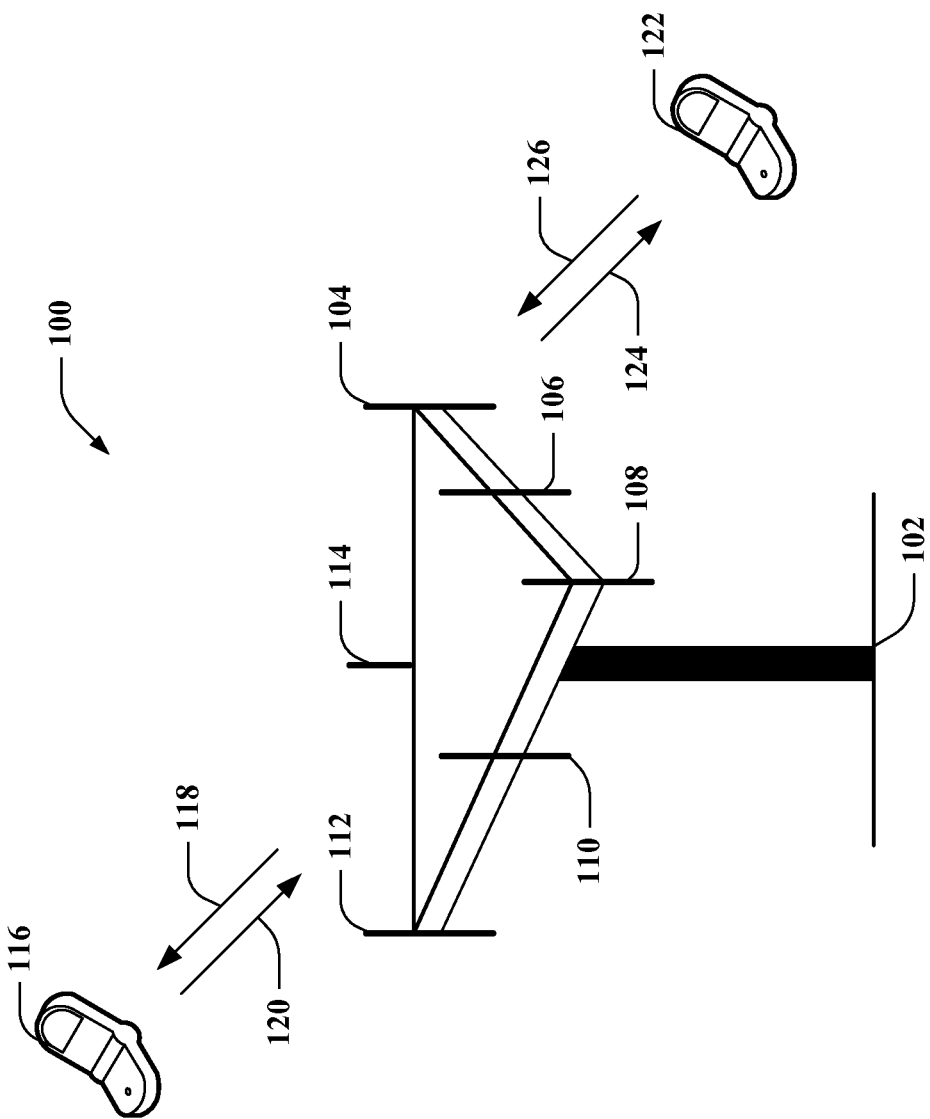
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, a Node B, an Evolved Node B (eNode B, eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 can be associated with a 3GPP access network, a non-3GPP access network, a combination thereof, etc. Pursuant to an example, a mobile device (e.g., mobile device 116, mobile device 122, ...) can attach to a 3GPP access network via base station 102; the mobile device can thereafter handover to a disparate base station (not shown) to attach to a non-3GPP access network. By way of another illustration, a mobile device (e.g., mobile device 116, mobile device 122, ...) can attach to a non-3GPP access network by way of base station 102, and can handover to a 3GPP access network (e.g., through a disparate base station, base station 102, ...). According to a further example, a mobile device (e.g., mobile device 116, mobile device 122, ...) can handover between 3GPP access and non-3GPP access via a common base station 102. It is to be appreciated, however, that the claimed subject matter is not limited to the aforementioned examples.

Mobile devices 116, 122 can utilize different mobility protocols in different interfaces. For example, network based mobility (e.g. General Packet Radio Service (GPRS) Tunneling Protocol (GTP), Proxy Mobile Internet Protocol (PMIP), . . . ) can be used while mobile device 116, 122 is in a 3GPP access. Further, client based mobility (e.g., Mobile Internet Protocol (MIP), . . . ) or network based mobility (e.g., PMIP, can be utilized when mobile device 116, 122 is in a non-3GPP access.

The termination point (e.g., anchor point, . . . ) of these protocols can be a Packet Data Network Gateway (PDN GW, PGW) (not shown). Moreover, an Internet Protocol (IP) address of the PDN GW serving mobile device 116, 122 can be stored at an Authentication, Accounting and Authorization/Home Subscriber Server (AAA/HSS) (not shown). Retention of the IP address at the AAA/HSS is utilized to identify a respective PDN GW that serves each mobile device 116, 122 at a given time. However, the PDN GW can have different IP addresses for a control plane (CP) and a user plane (UP) (e.g., as different boards implement different protocols, . . . ). For instance, the control plane can typically leverage a private address available to other network entities through a private Domain Name Server (DNS). By way of further example, the user plane address can commonly be a publicly available address, which can be present in a public DNS (e.g., Home Agent (HA) IP address, . . . ). Usage of disparate IP addresses, each associated with a common PDN GW, can lead to problems under conventional scenarios. However, system 100 can mitigate such deficiencies commonly encountered with typical techniques by employing reverse lookup within DNS to resolve a known IP address to a name, and utilizing the name to resolve a disparate IP address of the same node (e.g., PDN GW, . . . ).

Figure 2:
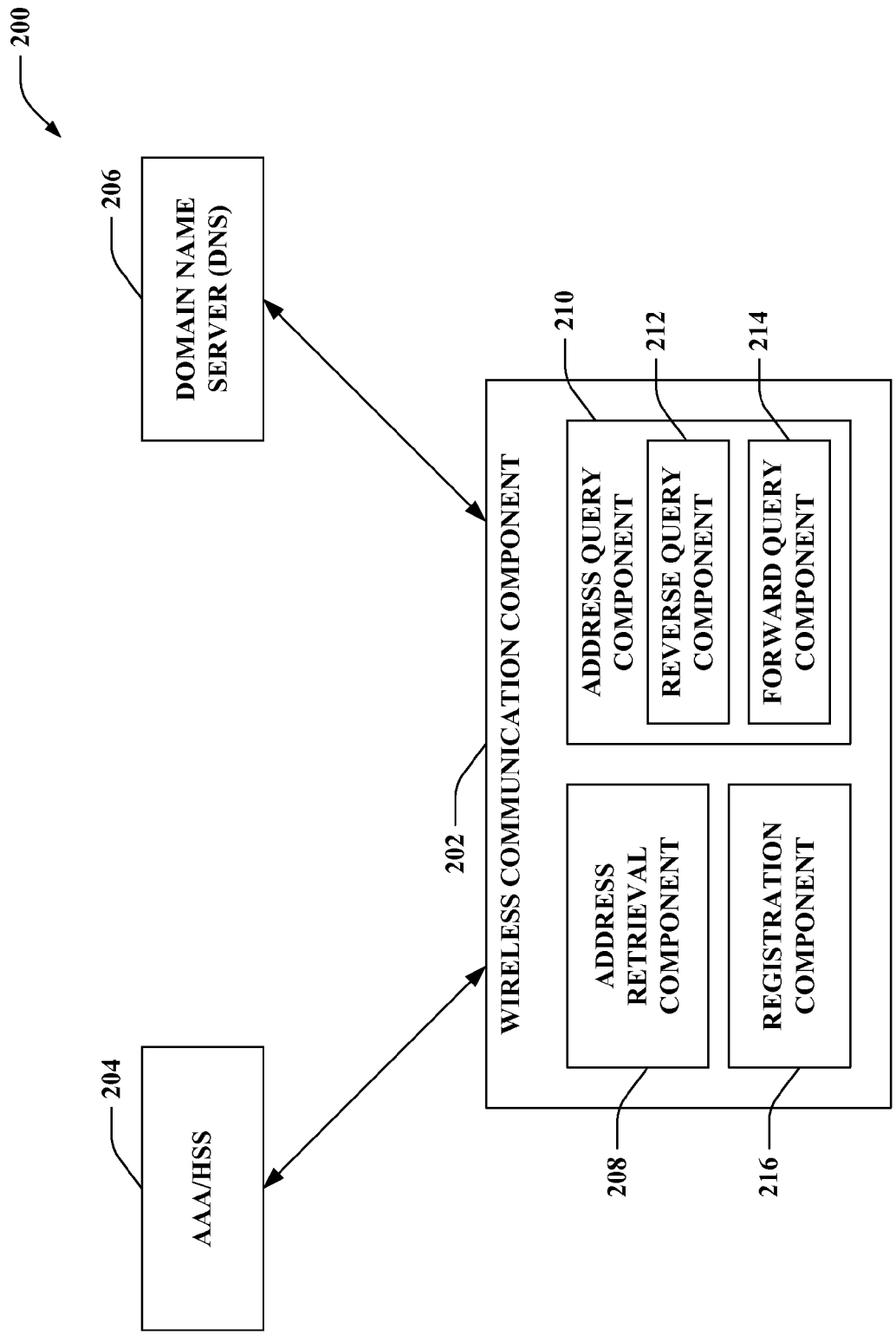
FIG. 2 is an illustration of an example system that supports address redirection for nodes with multiple IP addresses in a wireless communication environment.

Turning to FIG. 2, illustrated is a system 200 that supports address redirection for nodes with multiple IP addresses in a wireless communication environment. System 200 includes a wireless communication component 202, an Authentication, Accounting and Authorization/Home Subscriber Server (AAA/HSS) 204, and a Domain Name Server (DNS) 206. Wireless communication component 202, for instance, can be a gateway (e.g. non-3GPP gateway (non-3GPP GW), . . . ) (or a portion thereof), a Mobility Management Entity (MME) (or a portion thereof), or substantially any other wireless communication component that can retrieve, identify and/or register an IP address in a wireless communication environment.

DNS 206 can be a public DNS, a DNS of a network operator, a combination thereof, and so forth. According to another example, DNS 206 can include a plurality of Domain Name Servers. Moreover, DNS 206 is available to and reachable by wireless communication component 202 (e.g., non-3GPP GW, MME, . . . ).

A network node (e.g., network entity, PDN GW, . . . ) (not shown) can utilize two or more IP addresses for communication. The two or more IP addresses employed by the network node can be IPv4 address(es) and/or IPv6 address(es), for instance. By way of example, a first IP address (e.g., 10.1.2.3, . . . ) can be used for control plane functions associated with the network node, and a second IP address (e.g., 20.4.5.6, . . . ) can be utilized for user plane functions associated with the network node. It is to be appreciated, however, that the claimed subject matter is not limited to the aforementioned example; rather, any number of IP addresses can be associated with the network node, and any IP address is intended to fall within the scope of the heretoappended claims.

Wireless communication component 202 can retain, identify, etc. a subset of the IP addresses associated with the network node. For instance, wireless communication component 202 can include an address retrieval component 208 that retrieves an IP address corresponding to the network node from AAA/HSS 204. The IP address obtained using address retrieval component 208 can be associated with a first function (e.g., first protocol, . . . ). Pursuant to an example, the IP address of the network node corresponding to the first function can be stored at AAA/HSS 204 (e.g., registered at AAA/HSS 204 based upon a first mobility protocol utilized by a mobile device, . . . ). Such retrieved IP address obtained from AAA/HSS 204 via address retrieval component 208, however, can differ from a disparate IP address for the network node to be utilized for a second function (e.g., second protocol, . . . ). Following the foregoing example, the mobile device can transition between types of access (e.g., 3GPP access, non-3GPP access, . . . ), and thus, switch to employing a second mobility protocol.

Wireless communication component 202 can discover the disparate IP address for the network node corresponding to a second function (and/or any other IP address(es) related to the network node) by leveraging an address query component 210. Address query component 210 can query DNS 206 to obtain the disparate IP address. More particularly, address query component 210 can utilize the IP address obtained from AAA/HSS 204 using address retrieval component 208 as input to DNS 206.

Address query component 210 can further include a reverse query component 212 and a forward query component 212. Reverse query component 212 can perform a reverse query of DNS 206 using the IP address retrieved from AAA/HSS 204 (or a string constructed based upon the retrieved IP address) to resolve a name (e.g., Fully Qualified Domain Name (FQDN), . . . ). Moreover, forward query component 214 can effectuate a forward query of DNS 206. Input for the forward query can be the name obtained by reverse query component 212. Further, the forward query can resolve the disparate IP address for the network node associated with the second function.

Wireless communication component 202 can further comprise a registration component 216. Registration component 216 can update AAA/HSS 204 to include the disparate IP address for the network node obtained with address query component 210. For instance, registration component 216 can replace the IP address associated with the first function with the disparate IP address associated with the second function yielded by address query component 210 in AAA/HSS 204. According to another illustration, registration component 216 can cause a disparate component (e.g., PDN GW, . . . ) to update IP address information retained by AAA/HSS 204.

Pursuant to an example, a network node with two addresses for separate functions (e.g. ControlPlane.Function and UserPlane.Function, . . . ) can have records retained in DNS 206 as follows:

ControlPlane.Function→10.1.2.3
UserPlane.Function→20.4.5.6

Additional records for the network node can be stored in DNS 206. The additional records can include two reverse DNS entries and two forward DNS entries for the aforementioned example. By way of illustration, the reverse DNS entries can include the following:

3.2.1.10. in-addr.arpa→CPtoUP.Function
6.5.4.20. in-addr.arpa→UPtoCP.Function

Further, the additional forward DNS entries retained in DNS 206 can include the following:

CPtoUP.Function→20.4.5.6
UPtoCP.Function→10.1.2.3

According to this example, wireless communication component 202 can obtain one of the IP addresses (e.g. 10.1.2.3 or 20.4.5.6) associated with the network node from AAA/HSS 204 by leveraging address retrieval component 208. For illustration purposes, assume that the IP address 10.1.2.3 is retrieved from AAA/HSS 204; it is to be appreciated, however, that the claimed subject matter is not so limited. To discover the other IP address corresponding to the network node, wireless communication component 202 can utilize reverse query component 212 to effectuate a reverse lookup. More particularly, input for a query for the reverse lookup of 10.1.2.3 can be constructed by reverse query component 212 as a function of the retrieved IP address, 10.1.2.3; for instance, the constructed input for the reverse query can be 3.2.1.10. in-addr.arpa. In response thereto, DNS 206 can return a string such as, for example, CPtoUP.Function. Further, forward query component 214 can employ the string received by reverse query component 212 (e.g., CPtoUP-.Function, ... ) as input for a direct query of DNS 206, which can resolve the other IP address corresponding to the network node, 20.4.5.6. It is contemplated, however, that the claimed subject matter is not limited to the foregoing example. Instead, it is to be appreciated that any number of IP addresses can be associated with a particular network node, any names (e.g., strings, ... ) corresponding to such IP addresses can be retained in DNS 206, the IP addresses can relate to any functions (e.g., protocols, ... ), queries can be formulated in substantially any manner, and so forth.

Figure 3:
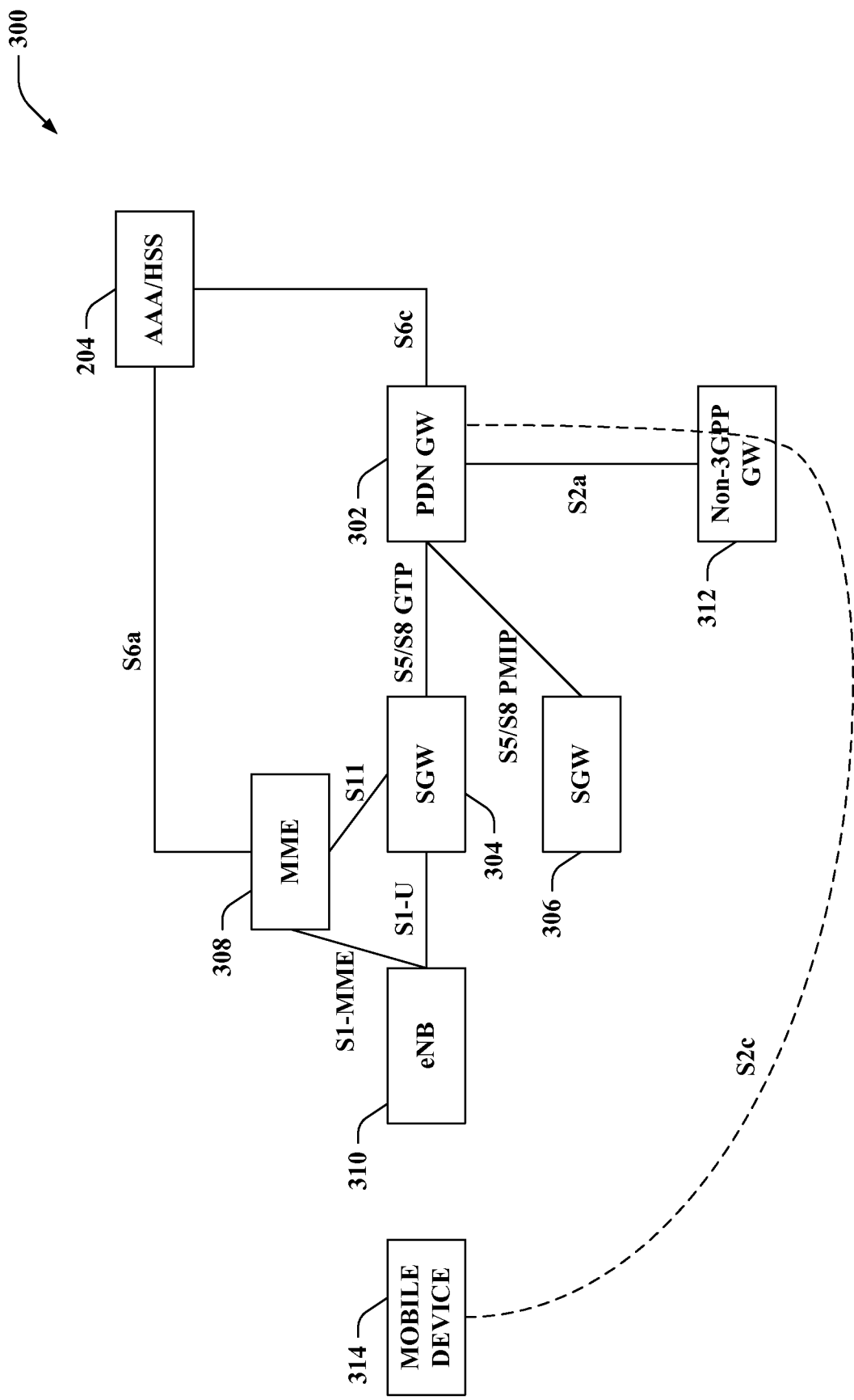
FIG. 3 is an illustration of an example system that utilizes address redirection in a wireless communication environment.

Now referring to FIG. 3, illustrated is a system 300 that utilizes address redirection in a wireless communication environment. For instance, system 300 can leverage an evolved packet system (EPS) network architecture; however, the claimed subject matter is not so limited. System 300 can include a core network. According to the depicted example, the core network can include AAA/HSS 204, a Packet Data Network Gateway (PDN GW) 302, Serving Gateways (SGWs) (e.g., GTP SGW 304 and PMIP SGW 306, ... ), and a Mobility Management Entity (MME) 308. Further, system 300 can include a 3GPP access network and a non-3GPP access network. The 3GPP access network can comprise Evolved Node B (eNodeB, eNB) 310. It is to be appreciated that the term eNB can also be referred to as an access point, a base station, or some other terminology. Moreover, the non-3GPP access network can include a non-3GPP Gateway (non-3GPP GW) 312. System 300 can also include a mobile device 314, which can attach to the 3GPP access network and/or the non-3GPP access network. It is to be appreciated that system 300 is presented as an example, and the claimed subject matter is not limited to this example.

System 300 includes various interfaces between nodes. For instance, an S6c interface can couple PDN GW 302 and AAA/HSS 204, and an S6a interface can connect MME 308 and AAA/HSS 204. Moreover, SGW 304 and PDN GW 302 can be connected via an S5/S8 GTP interface, and SGW 306 and PDN GW 302 can be coupled by way of an S5/S8 PMIP interface. Further, an S1-U interface can connect eNB 310 and SGW 304, an S11 interface can couple SGW 304 and MME 308, and an S1-MME interface can connect eNB 310 and MME 308. Non-3GPP GW 312 and PDN GW 302 can be coupled via an S2a interface. Moreover, an S2c interface can be utilized for direct communication between mobile device 314 and PDN GW 302.

PDN GW 302 can interface with external Packet Data Network(s) (PDN(s)) (not shown) (e.g., Internet, IP multimedia subsystem (IMS), ... ). PDN GW 302, for instance, can handle address allocation, policy enforcement, packet classification and routing, and so forth. Moreover, PDN GW 302 can be associated with a plurality of IP addresses.

Various example scenarios can illustrate difficulties commonly encountered when utilizing conventional techniques. According to an example scenario, mobile device 314 can attach to the 3GPP access network. For instance, 3GPP access can be served by GTP SGW 304 (e.g. SGW 304 can implement GTP as the network based mobility protocol, ... ). Upon connecting, MME 308 can select PDN GW 302 as a logical anchor (e.g., termination point, anchor point, ... ) for GTP. Further, MME 308 can register an IP address associated with PDN GW 302 at AAA/HSS 204. The IP address registered by MME 308 can be a control plane address (e.g., used in GTP-C procedures, ... ) for PDN GW 302. Thereafter, mobile device 314 can handover to non-3GPP access where PMIP can be used (e.g. via the S2a interface, ... ). Non-3GPP GW 312 can require the IP address of PDN GW 302 to send update messages for the mobility protocol (e.g., a registration message sent in PMIP such as a proxy binding update (PBU), ... ). Conventional techniques typically include retrieval of the IP address of PDN GW 302 from AAA/HSS 204. However, pursuant to this example, the IP address for PDN GW 302 retained in AAA/HSS 204 is the control plane address for GTP (e.g., GTP-C address, ... ), which can lack meaning for non-3GPP GW 312. Rather, non-3GPP GW 312 can require the IP address of PDN GW 302 for PMIP; conventional techniques, however, can fail to provide a suitable manner for retrieving such other IP address corresponding to PDN GW 302.

In accordance with another example scenario depicting deficiencies associated with conventional approaches, mobile device 314 can attach to the non-3GPP access network. For instance, client based mobility (e.g. MIP, ... ) can be used. Further, the S2c interface can be employed in connection with MIP. Mobile device 314 can select PDN GW 302 when using MIP, and an IP address for the chosen PDN GW 302 can be a publicly available address (e.g., home agent (HA) IP address, ... ). Thereafter, mobile device 314 can register with PDN GW 302, and PDN GW 302 can register the HA IP address at AAA/HSS 204. Mobile device 314 can then handover to 3GPP access where GTP can be used. Such access can be considered the home link. Further, MME 308 can attempt to discover PDN GW 302. MME 308 can try to create a bearer with PDN GW 302. For instance, MME 308 can retrieve the registered IP address from AAA/HSS 204; the retrieved IP address, however, can be the HA IP address for PDN GW 302 rather than the control plane IP address for GTP (e.g., GTP-C address, ... ) associated with PDN GW 302. MME 308 can require the GTP-C address to create the bearer with PDN GW 302. Thus, conventional techniques can inadequately address such scenario.

As illustrated in the foregoing example scenarios, different components of system 300 can use different IP addresses corresponding to a particular node (e.g., PDN GW 302, component, ... ). Accordingly, storing a subset (e.g., one, ... ) of the IP addresses of PDN GW 302 at AAA/HSS 204 can be inadequate. Further, storing all IP addresses associated with each node (e.g., retaining all IP addresses corresponding to PDN GW 302 in AAA/HSS 204, ... ) can result in a substantial increase in an amount of information retained in, sent to, received from, etc. AAA/HSS 204.

Techniques described herein, in contrast, enable leveraging a first IP address associated with a node (e.g., PDN GW 302, ... ) of system 300 retrieved from AAA/HSS 204 to identify disparate IP address(es) corresponding to such node. For example, a reverse DNS query can be constructed based upon the IP address for the node (e.g., PDN GW 302, ...) obtained from AAA/HSS 204 to resolve a name. Thereafter, a forward DNS query can be formulated based upon the name returned via the reverse DNS query to yield a different, second IP address for the node (e.g., PDN GW 302, ...).

Address redirection can be illustrated by way of the following example scenario. Mobile device 314 can perform a query to a public DNS to discover an HA IP address for PDN GW 302 when attaching via non-3GPP access. For instance, input for the forward query can be UserPlane.Function, which can yield an HA IP address for PDN GW 302 of 20.4.5.6. When mobile device 314 performs MIP registration or bootstrapping, PDN GW 302 can store the HA IP address (e.g., 20.4.5.6, ...) at AAA/HSS 204. Thereafter, mobile device 314 can move to 3GPP access. After handover of mobile device 314 to 3GPP access, MME 308 can retrieve the HA IP address (e.g. 20.4.5.6, ...) from AAA/HSS 204 (e.g. using address retrieval component 208 of FIG. 2, ...). MME 308, however, can be unable to directly utilize the HA IP address (e.g., MME 308 can use a control plane IP address to create a bearer with PDN GW 302, ...). Thus, MME 308 can further perform a reverse query of a DNS (e.g., DNS 206 of FIG. 2, ...) based on the HA IP address (e.g., leveraging reverse query component 212 of FIG. 2, ...), which can return a specific name (e.g., FQDN, ...). By way of illustration, input for the reverse query can be 6.5.4.20. in-addr.arpa and the yielded name can be UPtoCP.Function. Moreover, MME 308 can perform a forward query (e.g., employing forward query component 214 of FIG. 2, ...) of DNS using the name obtained in response to the reverse query as input, and the forward query can return a control plane IP address. Pursuant to an example, UPtoCP.Function can resolve to a control plane IP address of 10.1.2.3. Thereafter, the control plane IP address (e.g., 10.1.2.3, ...) can be utilized to set up a GTP bearer. Moreover, MME 308 can update AAA/HSS 204 to include the control plane IP address for PDN GW 302. It is to be appreciated, however, that the claimed subject matter is not limited to the aforementioned example scenario.

Similar to the aforementioned example, a control plane IP address can be converted to a Local Mobility Anchor (LMA) IP address for PDN GW 302. Mobile device 314 can attach by way of 3GPP access, and MME 308 can select PDN GW 302 and register a control plane IP address of PDN GW 302 at AAA/HSS 204. Thereafter, mobile device 314 can transition to non-3GPP access using PMIP. Accordingly, non-3GPP GW 312 can retrieve the control plane IP address of PDN GW 302 from AAA/HSS 204. Non-3GPP GW 312 can effectuate a reverse query of DNS based on the control plane IP address, which can resolve to a specific name (e.g., CPtoUP. Function, ...). Further, non-3GPP GW 312 can perform a forward query of DNS using the specific name obtained by way of the reverse query as input; the forward query can return the LMA IP address for PDN GW 302. Yet, the claimed subject matter is not so limited.

Moreover, it is contemplated that address redirection as described herein can be employed in connection with nodes with more than two IP addresses. For instance, a node can be associated with more than two IP addresses, each for a different function. By way of illustration, an example entity with greater than two addresses for separate functions can have DNS records such as the following:
ControlPlane.Function.1→10.1.2.3
ControlPlane.Function.2→10.1.2.4
UserPlane.Function→20.4.5.6

Further, reverse DNS records can each point to a common name as follows:
3.2.1.1. in-addr.arpa→Function_Rev_Name
4.2.1.1. in-addr.arpa→Function_Rev_Name
6.5.4.20. in-addr.arpa→Function_Rev_Name Moreover, resolvers (e.g., associated with forward query component 214, ...) can use predefined prefixes, each corresponding to a particular function (e.g. CP1, CP2, UP, ...). Thus, a predefined prefix (e.g., selected based on a function desired to be employed, ...) can be added to the common name, and the combination can be used as input for a forward DNS query. The forward DNS records can include the following:
CP1. Function_Rev_Name→10.1.2.3
CP2. Function_Rev_Name→10.1.2.4
UP.Function_Rev_Name→20.4.5.6

It is contemplated that the claimed subject matter, however, is not limited to the foregoing example.

Figure 4:
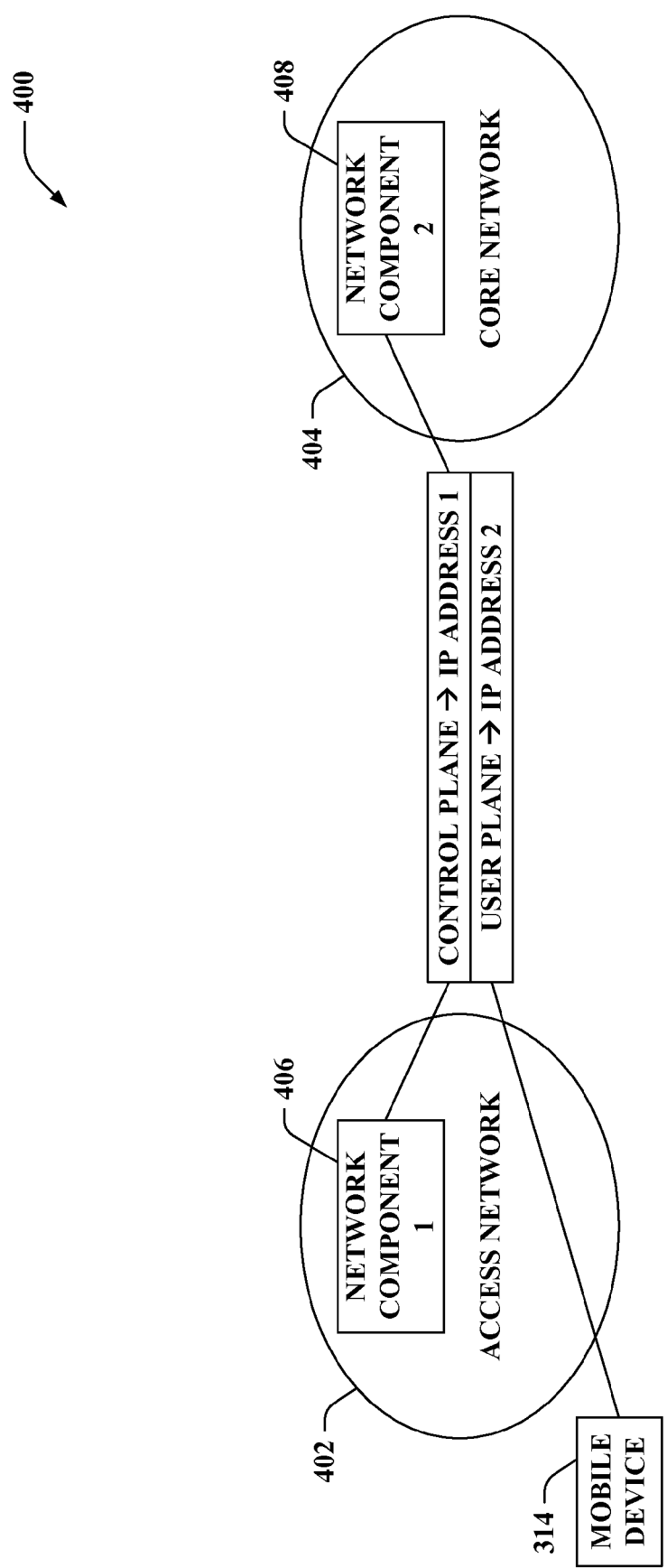
FIG. 4 is an illustration of an example system that illustrates use of multiple IP addresses for a common network node.

Referring to FIG. 4, illustrated is an example system 400 that illustrates use of multiple IP addresses for a common network node. System 400 can include an access network 402 and a core network 404. Access network 402 can further include a network component 1 406 (e.g., network node 1, network entity 1, ...) and core network 404 can further include a network component 2 408 (e.g., network node 2, network entity 2, ...). By way of illustration, network component 2 408 can be a PDN GW (e.g., PDN GW 302 of FIG. 3, ...); however, the claimed subject matter is not so limited. Moreover, system 400 can include mobile device 314.

Network component 2 408 can be associated with a plurality of IP addresses. For instance, a control plane IP address (e.g., IP address 1, ...) and a user plane IP address (e.g., IP address 2, ...) can correspond with network component 2 408. By way of example, network component 1 406 can send a GTP update via the control plane to IP address 1 for network component 2 408. According to another example, mobile device 314 can transmit a MIP message by way of the user plane to IP address 2 for network component 2 408. Yet, it is contemplated that the claimed subject matter is not limited to the aforementioned examples, and system 400 is merely presented for illustration purposes.

Figure 5:
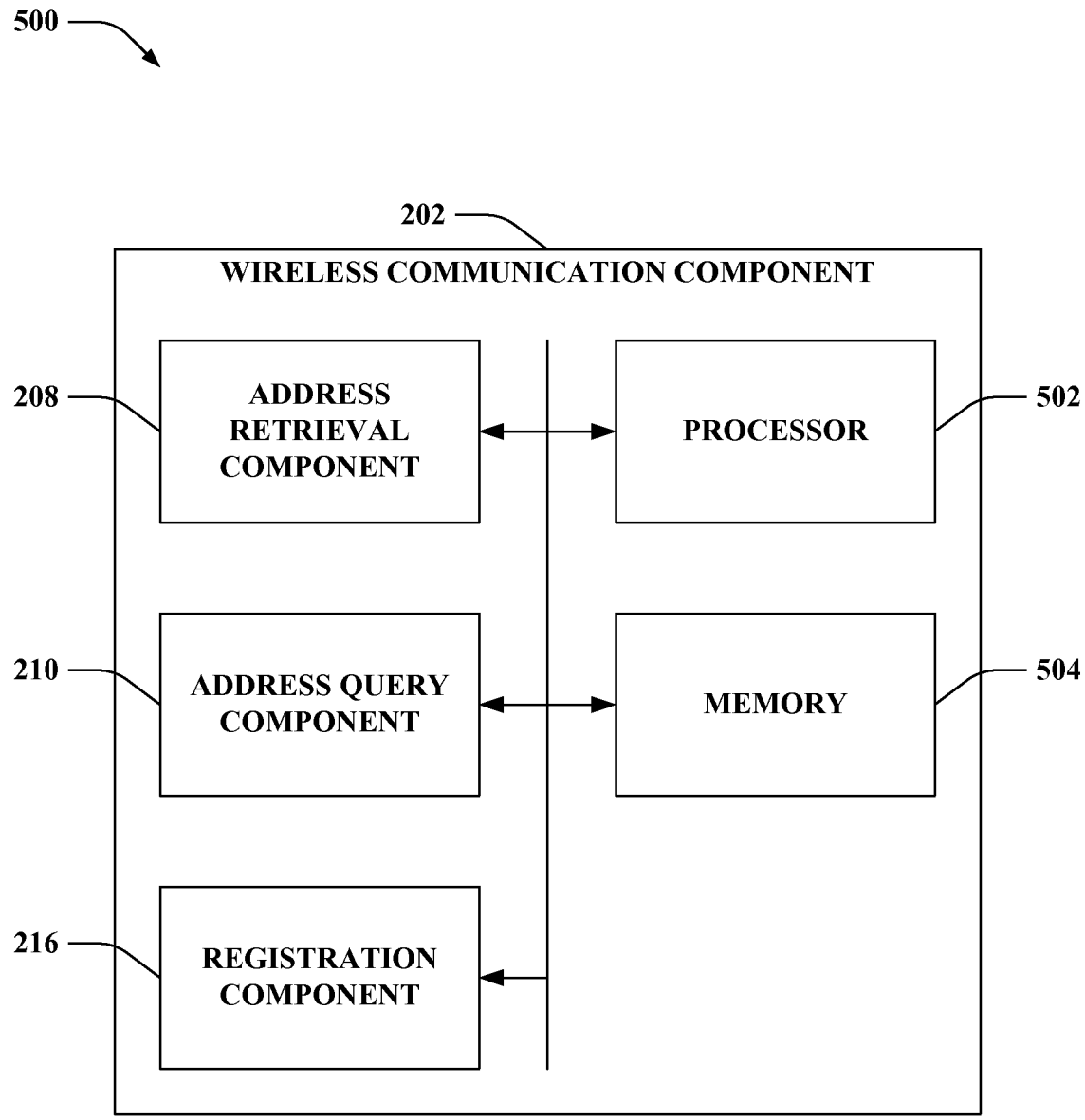
FIG. 5 is an illustration of an example system that includes a wireless communication component that facilitates identifying IP address(es) of nodes in a wireless communication environment.

FIG. 5 is an illustration of an example system 600 that includes a wireless communication component 202 that facilitates identifying IP address(es) of nodes in a wireless communication environment. Wireless communication component 202 can be a MME (e.g., MME 308 of FIG. 3, ...) (or a portion thereof), a non-3GPP GW (e.g., non-3GPP GW 312 of FIG. 3, ...) (or a portion thereof), or the like. Moreover, wireless communication component 202 can include address retrieval component 208, address query component 210, and registration component 216. Although not depicted, it is to be appreciated that address query component 210 can further include a reverse query component (e.g., reverse query component 212 of FIG. 2, ...) and/or a forward query component (e.g., forward query component 214 of FIG. 2, ...).

Wireless communication component 202 can further include a processor 502. Processor 502 can be a processor that controls one or more components of wireless communication component 202, generates information for transmission by wireless communication component 202, analyzes information received by wireless communication component 202, and so forth.

Wireless communication component 202 can additionally comprise memory 504 that is operatively coupled to processor 502 and that can store data to be transmitted, received data, information related to DNS queries, IP address(es), and/or any other suitable information. Memory 504 can additionally store protocols and/or algorithms associated with retrieving IP addresses from an AAA/HSS, constructing reverse and forward DNS queries, redirecting communication, registering IP addresses at an AAA/HSS, and so forth.

It will be appreciated that the data store (e.g., memory 504) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 504 of the subject systems and methods is intended to comprise, without being limited to, these and any other suitable types of memory.

Figure 6:
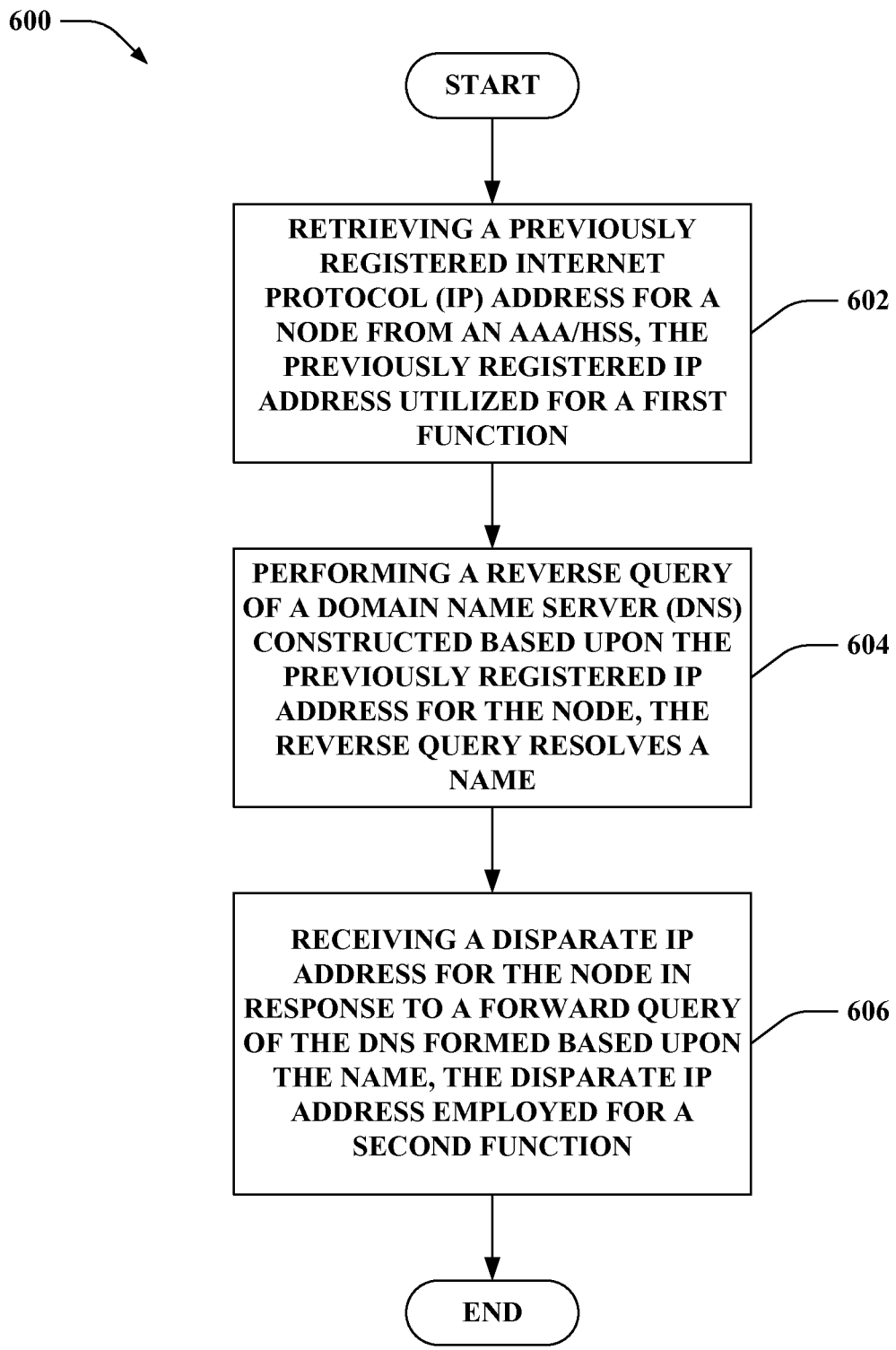
FIG. 6 is an illustration of an example methodology that facilitates obtaining an Internet Protocol (IP) address of a node with multiple IP addresses in a wireless communication environment.
Figure 7:
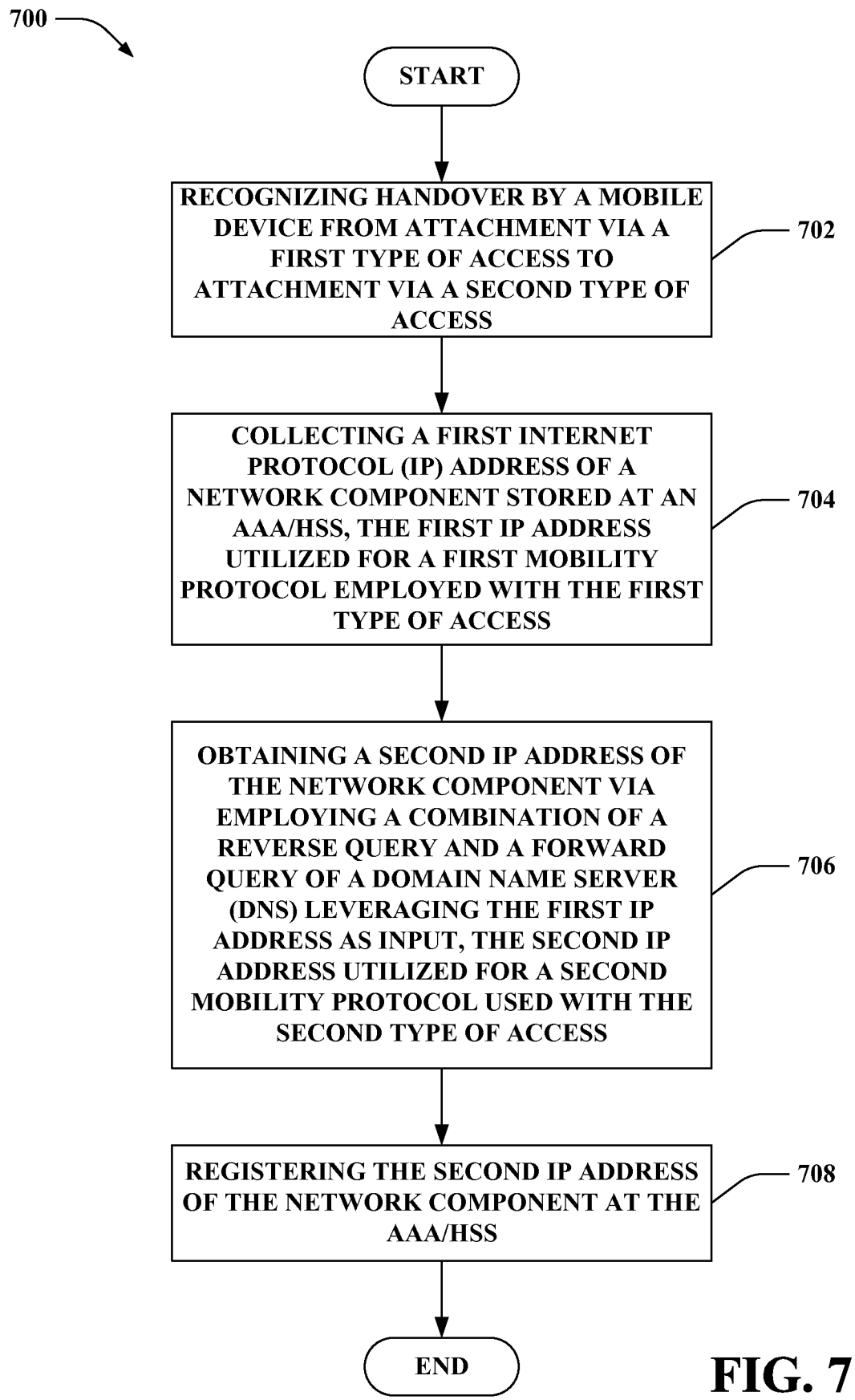
FIG. 7 is an illustration of an example methodology that facilitates updating Internet Protocol (IP) address information associated with a network component (e.g., node, . . . ) within a wireless communication environment.
Figure 8:
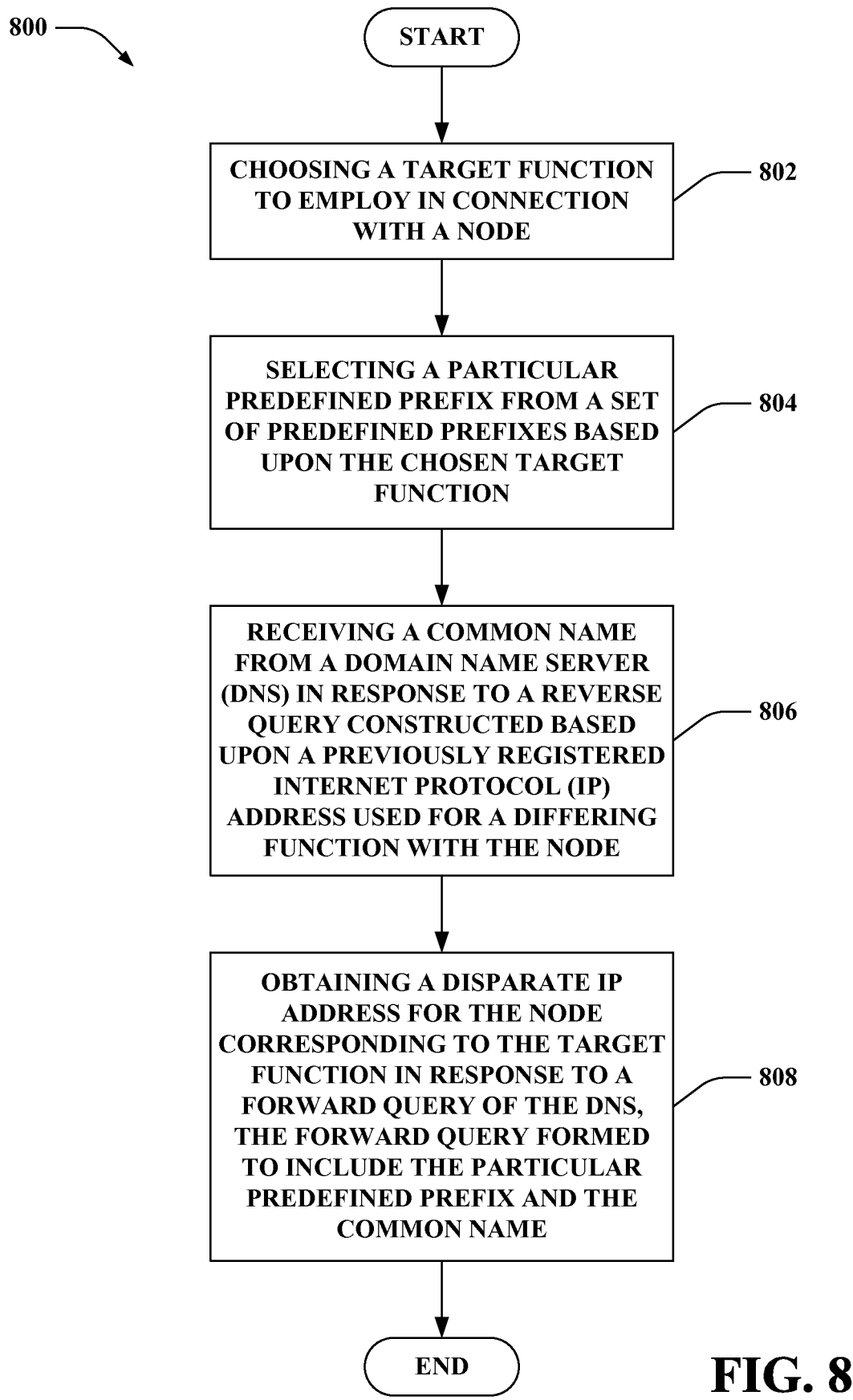
FIG. 8 is an illustration of an example methodology that facilitates recognizing an Internet Protocol (IP) address of a node that includes more than two IP addresses in a wireless communication environment.

Referring to FIGS. 6-8, methodologies relating to address redirection for nodes with multiple IP addresses are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 6, illustrated is a methodology 600 that facilitates obtaining an Internet Protocol (IP) address of a node with multiple IP addresses in a wireless communication environment. At 602, a previously registered Internet Protocol (IP) address for a node can be retrieved from an Authentication, Accounting and Authorization/Home Subscriber Server (AAA/HSS). For instance, the previously registered IP address can be utilized for a first function. The first function can be employed in connection with a first type of access (e.g., 3GPP access, non-3GPP access, . . . ). According to an illustration, the previously registered IP address for the node can be retrieved in response to a mobile device handing over to a second type of access (e.g., transitioning from 3GPP access to non-3GPP access, from non-3GPP access to 3GPP access, . . . ). Moreover, the AAA/HSS can retain one IP address corresponding to the node, while the node can be associated with a plurality of IP addresses (e.g., two IP addresses, more than two IP addresses, . . . ). Further, each of the plurality of IP addresses for the node can correspond to a differing function. Pursuant to an example, the node can be a Packet Data Network Gateway (PDN GW); however, the claimed subject matter is not so limited. At 604, a reverse query of a Domain Name Server (DNS) constructed based upon the previously registered IP address for the node can be performed. The reverse query can resolve a name (e.g., Fully Qualified Domain Name (FQDN), . . . ). At 606, a disparate IP address for the node can be received in response to a forward query of the DNS formed based upon the name. Moreover, the disparate IP address can be employed for a second function. The second function, for instance, can be utilized in connection with the second type of access. Further, communication with the node can be effectuated utilizing the disparate IP address. According to an example, the previously registered IP address and/or the disparate IP address can be an IPv4 address; each IPv4 address can be represented in the DNS by an A resource record for forward query. By way of another example, the previously registered IP address and/or the disparate IP address can be an IPv6 address, where each IPv6 address can be represented in the DNS by an AAAA resource record for forward query. It is contemplated that the previously registered IP address and the disparate IP address can be the same type of address (e.g., both IPv4 addresses or both IPv6 addresses, . . . ) or differing types of addresses (e.g., one can be an IPv4 address and the other can be an IPv6 address, . . . ).

According to an example, the first function can be a control plane function and the second function can be a user plane function. By way of another illustration, the first function can be a user plane function and the second function can be a control plane function. Pursuant to a further example, the first function and the second function can be differing control plane functions. It is to be appreciated, however, that the claimed subject matter is not limited to the aforementioned examples.

In accordance with an example, the methodology 600 can be effectuated by a non-3GPP gateway. Thus, a mobile device can handover from 3GPP access to non-3GPP access. Moreover, the previously registered IP address retrieved from the AAA/HSS can be a control plane IP address (e.g., GTP-C address, . . . ) of a PDN GW. Further, the disparate IP address received from the DNS can be a user plane IP address of the PDN GW. The AAA/HSS can be updated to include the user plane IP address and/or the user plane IP address can be employed by the non-3GPP gateway.

By way of a further example, the methodology 600 can be performed by a Mobility Management Entity (MME). Following this example, a mobile device can transition from non-3GPP access to 3GPP access. Additionally, the previously registered IP address retrieved from the AAA/HSS can be a user plane IP address (e.g., Home Agent (HA) IP address, . . . ) of a PDN GW. Moreover, the disparate IP address received from the DNS can be a control plane IP address of the PDN GW. The control plane IP address, for instance, can be used to initialize a GPRS Tunneling Protocol (GTP) bearer (e.g., when the control plane IP address is a GTC-C address, . . . ). Additionally or alternatively, the AAA/HSS can be updated to retain the control plane IP address.

Now referring to FIG. 7, illustrated is a methodology 700 that facilitates updating Internet Protocol (IP) address information associated with a network component (e.g., node, . . . ) within a wireless communication environment. At 702, handover by a mobile device from attachment via a first type of access to attachment via a second type of access can be recognized. For instance, the mobile device can transition between 3GPP access and non-3GPP access. At 704, a first Internet Protocol (IP) address of a network component stored at an Authentication, Accounting and Authorization/Home Subscriber Server (AAA/HSS) can be collected. The first IP address, for example, can be utilized for a first mobility protocol employed with the first type of access. The network component, for instance, can be a Packet Data Network Gateway (PDN GW); yet, the claimed subject matter is not so limited. Moreover, the first IP address can be collected in response to recognizing the handover by the mobile device, for instance. At 706, a second IP address of the network component can be obtained via employing a combination of a reverse query and a forward query of a Domain Name Server (DNS) leveraging the first IP address as input. Moreover, the second IP address can be utilized for a second mobility protocol used with the second type of access. At 708, the second IP address of the network component can be registered at the AAA/HSS.

With reference to FIG. 8, illustrated is a methodology 800 that facilitates recognizing an Internet Protocol (IP) address of a node that includes more than two IP addresses in a wireless communication environment. At 802, a target function to employ with a node can be chosen. For instance, the target function can be a control plane function, a user plane function, or the like. At 804, a particular predefined prefix can be selected from a set of predefined prefixes based upon the chosen target function. Each function with a unique IP address for the node can be associated with a respective predefined prefix in the set. At 806, a common name can be received from a Domain Name Server (DNS) in response to a reverse query constructed based upon a previously registered IP address used for a differing function with the node. For instance, the previously registered IP address can be retrieved from an Authentication, Accounting and Authorization/Home Subscriber Server (AAA/HSS). At 808, a disparate IP address for the node corresponding to the target function can be obtained in response to a forward query of the DNS. Further, the forward query can be formed to include the particular predefined prefix and the common name.

It will be appreciated that, in accordance with one or more aspects described herein, inferences can be made regarding redirecting an IP address for a node with a plurality of IP addresses in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to choosing a target function to employ in connection with a node. By way of further illustration, an inference can be made related to determining whether to effectuate a combination of reverse and forward DNS queries. It will be appreciated that the foregoing examples are illustrative in nature and are not intended to limit the number of inferences that can be made or the manner in which such inferences are made in conjunction with the various embodiments and/or methods described herein.

Figure 9:
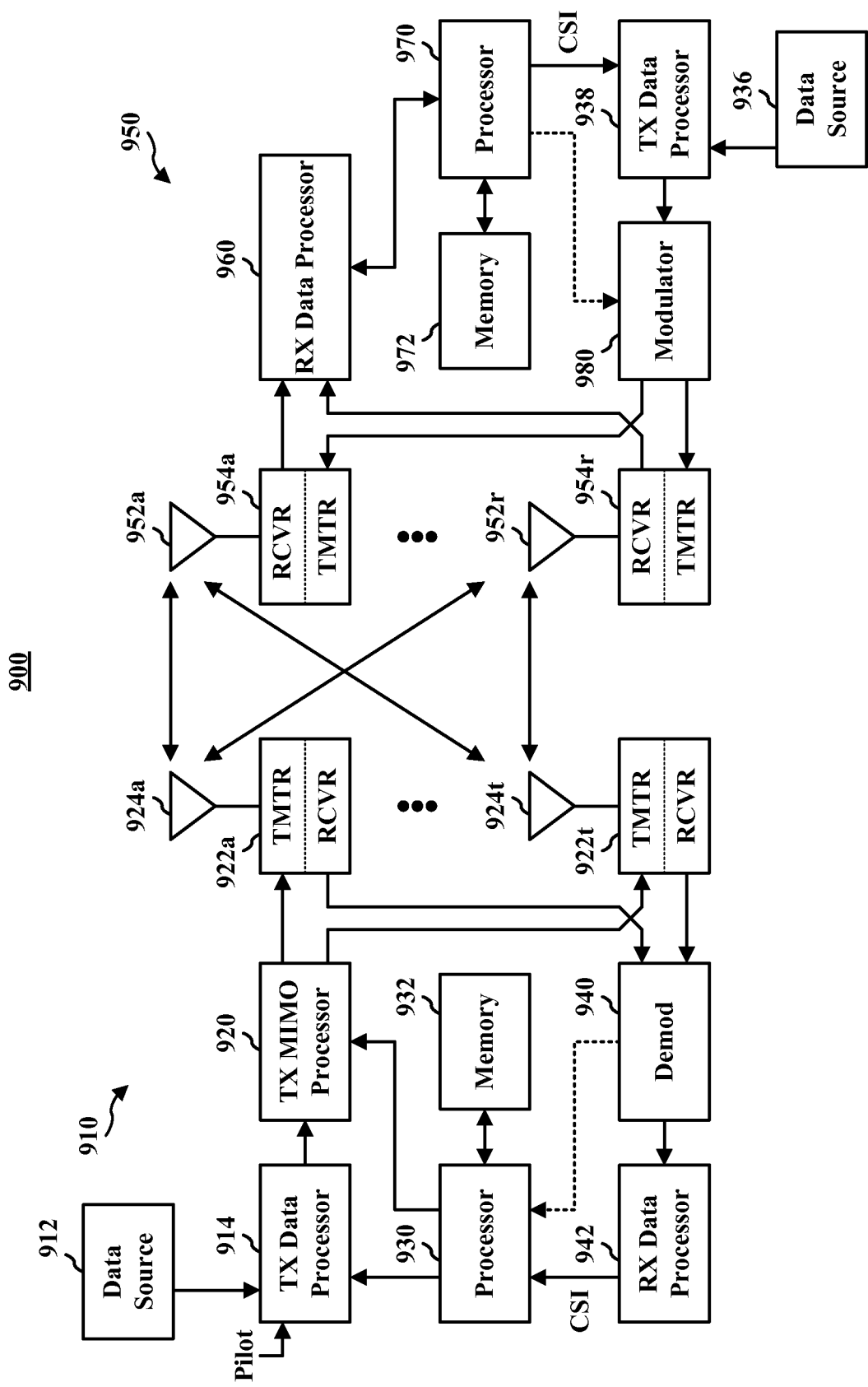
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-5 and 9-10) and/or methods (FIGS. 6-8) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which preceding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which preceding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
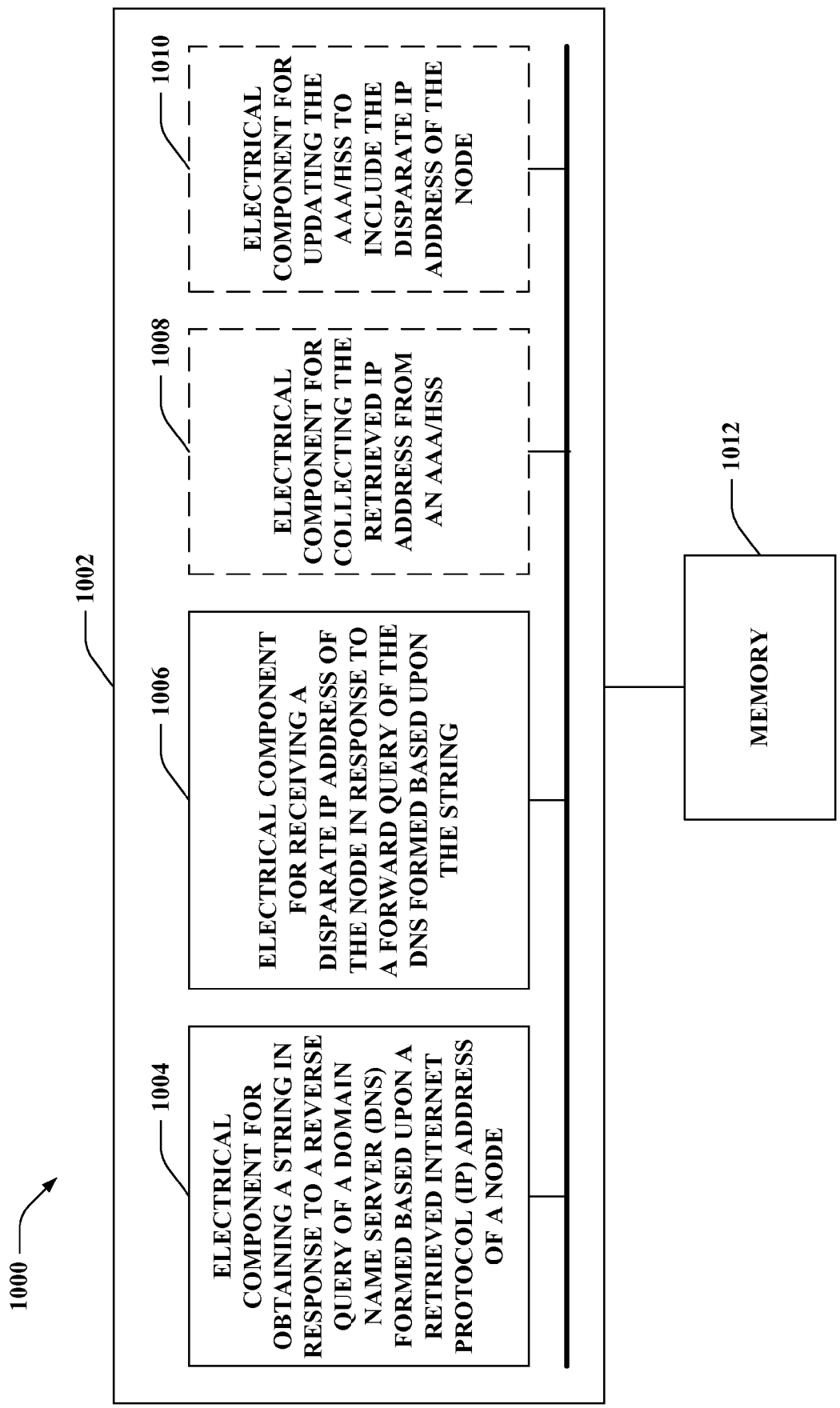
FIG. 10 is an illustration of an example system that enables redirecting an Internet Protocol (IP) address for a node with multiple IP addresses in a wireless communication environment.

With reference to FIG. 10, illustrated is a system 1000 that enables redirecting an Internet Protocol (IP) address for a node with multiple IP addresses in a wireless communication environment. For example, system 1000 can reside at least partially within a gateway (e.g., non-3GPP gateway, . . . ), a Mobility Management Entity (MME), or the like. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for obtaining a string in response to a reverse query of a Domain Name Server (DNS) formed based upon a retrieved Internet Protocol (IP) address of a node 1004. Further, logical grouping 1002 can include an electrical component for receiving a disparate IP address of the node in response to a forward query of the DNS formed based upon the string 1006. Logical grouping 1002 can also optionally include an electrical component for collecting the retrieved IP address from an Authentication, Accounting and Authorization/Home Subscriber Server (AAA/HSS) 1008. Moreover, logical grouping 1002 can optionally include an electrical component for updating the AAA/HSS to include the disparate IP address of the node 1010. Additionally, system 1000 can include a memory 1012 that retains instructions for executing functions associated with electrical components 1004, 1006, 1008, and 1010. While shown as being external to memory 1012, it is to be understood that one or more of electrical components 1004, 1006, 1008, and 1010 can exist within memory 1012.

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g. a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal. In the alternative, the processor and the storage medium can reside as discrete components in a user terminal. Additionally, in some aspects, the steps and/or actions of a method or algorithm can reside as one or any combination or set of codes and/or instructions on a machine readable medium and/or computer readable medium, which can be incorporated into a computer program product.

In one or more aspects, the functions described can be implemented in hardware, software, firmware, or any combination thereof If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. A method, comprising:
    retrieving a previously registered Internet Protocol (IP) address corresponding to a node from an Authentication, Accounting, and Authorization/Home Subscriber Server (AAA/HSS), the previously registered IP address associated with a first function, wherein more than two IP addresses are associated with the node;
    retrieving a user plane IP address of a Packet Data Network Gateway (PDN GW) from the AAA/HSS at a Mobility Management Entity (MME);
    selecting a prefix from a set of prefixes, wherein each prefix in the set of prefixes corresponds to a different function supported by the node, and wherein the selected prefix corresponds to a second function supported by the node;
    performing a reverse query of a Domain Name Server (DNS) formed as a function of the user plane IP address by the MME, the reverse query constructed based upon the previously registered IP address for the node;
    receiving a name from the DNS in response to the reverse query;
    performing a forward query of the DNS, the forward query constructed based upon the selected prefix and the name;
    receiving a disparate IP address for the node in response to the forward query of the DNS, the disparate IP address associated with the second function;
    receiving a control plane IP address for the PDN GW in response to the forward query of the DNS at the MME;
    initializing a General Packet Radio Service (GPRS) Tunneling Protocol (GTP) bearer using the control plane IP address; and
    switching between different types of access, based on at least one of the first function and the second function, using the previously registered IP address and the disparate IP address.

2. The method of claim 1, wherein at least one of the previously registered IP address or the disparate IP address is an IPv4 address, and the IPv4 address is represented in the DNS by an A resource record for forward query.

3. The method of claim 1, wherein at least one of the previously registered IP address or the disparate IP address is an IPv6 address, and the IPv6 address is represented in the DNS by an AAA A resource record for forward query.

4. The method of claim 1, wherein the node is a Packet Data Network Gateway.

5. The method of claim 1, wherein the first function is employed in connection with a first type of access by a mobile device and the second function is utilized in connection with a second type of access by the mobile device.

6. The method of claim 1, further comprising communicating with the node utilizing the disparate IP address.

7. The method of claim 1, further comprising:
    retrieving the control plane IP address of the Packet Data Network Gateway (PDN GW) from the AAA/HSS at a non-3GPP gateway;
    performing the reverse query of the DNS formed as a function of the control plane IP address by the non-3GPP gateway; and
    receiving the user plane IP address for the PDN GW in response to the forward query of the DNS at the non-3GPP gateway.

8. The method of claim 1, wherein the previously registered IP address is used for the non-3GPP access and the disparate IP address is used for the 3GPP access.

9. The method of claim 1, wherein the different types of access comprise at least a non-3GPP access and a 3GPP access.

10. The method of claim 1, wherein the first function is a control plane function and the second function is a user plane function.

11. A wireless communications apparatus, comprising:
    at least one processor, comprising hardware, configured to:
        retrieve a previously registered Internet Protocol (IP) address corresponding to a node from an Authentication, Accounting, and Authorization/Home Subscriber Server (AAA/HSS), the previously registered IP address associated with a first function, wherein more than two IP addresses are associated with the node;
        retrieve a user plane IP address of a Packet Data Network Gateway (PDN GW) from the AAA/HSS at a Mobility Management Entity (MME);
        select a prefix from a set of prefixes, wherein each prefix in the set of prefixes corresponds to a different function supported by the node, and wherein the selected prefix corresponds to a second function supported by the node;
        perform a reverse query of a Domain Name Server (DNS) formed as a function of the user plane IP address by the MME, the reverse query constructed based upon the previously registered IP address for the node;
        receive a name from the DNS in response to the reverse query;
        perform the forward query of the DNS, the forward query constructed based upon the selected prefix and the name;
        receive a disparate IP address for the node in response to the forward query of the DNS, the disparate IP address associated with the second function;
        receive a control plane IP address for the PDN GW in response to the forward query of the DNS at the MME;
        initialize a General Packet Radio Service (GPRS) Tunneling Protocol (GTP) bearer using the control plane IP address; and switch between different types of access, based on at least one of the first function and the second function, using the previously registered IP address and the disparate IP address.

12. The wireless communications apparatus of claim 11, further comprising:
at least one processor configured to:
collect the previously registered IP address corresponding to the node from the AAA/HSS.

13. The wireless communications apparatus of claim 11, wherein at least one of the previously registered IP address or the disparate IP address is an IPv4 address, and the IPv4 address is represented in the DNS by an A resource record for forward query.

14. The wireless communications apparatus of claim 11, wherein at least one of the previously registered IP address or the disparate IP address is an IPv6 address, and the IPv6 address is represented in the DNS by an AAA A resource record for forward query.

15. An apparatus, comprising:
means for retrieving a previously registered Internet Protocol (IP) address corresponding to a node from an Authentication, Accounting, and Authorization/Home Subscriber Server (AAA/HSS), the previously registered IP address associated with a first function, wherein more than two IP addresses are associated with the node;
means for retrieving a user plane IP address of a Packet Data Network Gateway (PDN GW) from the AAA/HSS at a Mobility Management Entity (MME);
means for selecting a prefix from a set of prefixes, wherein each prefix in the set of prefixes corresponds to a different function supported by the node, and wherein the selected prefix corresponds to a second function supported by the node;
means for performing a reverse query of a Domain Name Server (DNS) formed as a function of the user plane IP address by the MME, the reverse query constructed based upon the previously registered IP address for the node;
means for receiving a name in response to the reverse query;
means for performing a forward query of the DNS, the forward query constructed based upon the selected prefix and the name;
means for receiving a disparate IP address for the node in response to the forward query of the DNS, the disparate IP address associated with the second function;
means for receiving a control plane IP address for the PDN GW in response to the forward query of the DNS at the MME;
means for initializing a General Packet Radio Service (GPRS) Tunneling Protocol (GTP) bearer using the control plane IP address; and
means for switching between different types of access, based on at least one of the first function and the second function, using the previously registered IP address and the disparate IP address.

16. The apparatus of claim 15, further comprising means for collecting the previously registered IP address from an Authentication, Accounting, and Authorization/Home Subscriber Server (AAA/HSS).

17. The apparatus of claim 15, wherein the node is a Packet Data Network Gateway.

18. The apparatus of claim 15, wherein the previously registered IP address of the node is the control plane IP address and the disparate IP address of the node is the user plane IP address.

19. The apparatus of claim 18, wherein the user plane IP address is received at a non-3GPP gateway.

20. The apparatus of claim 15, wherein the previously registered IP address of the node is the user plane IP address and the disparate IP address of the node is the control plane IP address.

21. The apparatus of claim 15, wherein the MME uses the control plane IP address to configure a bearer.

22. A computer program product, comprising:
a non-transitory computer-readable medium comprising:
code for causing at least one computer to retrieve a previously registered Internet Protocol (IP) address corresponding to a node from an Authentication, Accounting, and Authorization/Home Subscriber Server (AAA/HSS), the previously registered IP address associated with a first function, wherein more than two IP addresses are associated with the node;
code for causing at least one compute to retrieve a user plane IP address of a Packet Data Network Gateway (PDN GW) from the AAA/HSS at a Mobility Management Entity (MME);
code for causing at least one computer to select a prefix from a set of prefixes, wherein each prefix in the set of prefixes corresponds to a different function supported by the node, and wherein the selected prefix corresponds to a second function supported by the node;
code for causing at least one computer to perform a reverse query of a Domain Name Server (DNS) formed as a function of the user plane IP address by the MME, the reverse query constructed based upon the previously registered IP address for the node;
code for causing at least one computer to receive a name from the DNS in response to the reverse query;
code for causing at least one computer to perform a forward query of the DNS, the forward query constructed based upon the selected prefix and the name;
code for causing at least one computer to receive a disparate IP address for the node in response to the forward query of the DNS, the disparate IP address associated with the second function;
code for causing at least one compute to receive a control plane IP address for the PDN GW in response to the forward query of the DNS at the MME;
code for causing at least one compute to initialize a General Packet Radio Service (GPRS) Tunneling Protocol (GTP) bearer using the control plane IP address; and
code for causing at least one computer to switch between different types of access, based on at least one of the first function and the second function, using the previously registered IP address and the disparate IP address.

23. The computer program product of claim 22, wherein the computer-readable medium further comprises:
code for causing at least one computer to collect the control plane IP address of the Packet Data Network Gateway (PDN GW) from the AAA/HSS at a non-3GPP gateway;
code for causing at least one computer to form the reverse query as a function of the control plane IP address; and
code for causing at least one computer to receive the user plane IP address from the DNS in response to the forward query at the non-3GPP gateway.

24. An apparatus, comprising:
an address retrieval component, comprising hardware, that:
retrieves a previously registered Internet Protocol (IP) address corresponding to a node from an Authentication, Accounting, and Authorization/Home Subscriber Server (AAA/HSS), the previously registered IP address associated with a first function, wherein more than two IP addresses are associated with the node;

retrieves a user plane IP address of a Packet Data Network Gateway (PDN GW) from the AAA/HSS at a Mobility Management Entity (MME);

a resolver component that selects a prefix from a set of prefixes, wherein each prefix in the set of prefixes corresponds to a different function supported by the node, and wherein the selected prefix corresponds to a second function supported by the node;

a reverse query component that performs a reverse query of a Domain Name Server (DNS) formed as a function of the user plane IP address by the MME, the reverse query constructed based upon the previously registered IP address for the node, and that receives a name from the DNS in response to the reverse query;

a forward query component that:
 performs a forward query of the DNS, the forward query constructed based upon the selected prefix and the name;
 receives a disparate IP address for the node in response to the forward query of the DNS, the disparate IP address associated with the second function;
 receives a control plane IP address for the PDN GW in response to the forward query of the DNS at the MME;
 initializes a General Packet Radio Service (GPRS) Tunneling Protocol (GTP) bearer using the control plane IP address; and a wireless communication component that switches between different types of access, based on at least one of the first function and the second function, using the previously registered IP address and the disparate IP address.

25. The apparatus of claim 24, wherein the previously registered IP address is used for the non-3GPP access and the disparate IP address is used for the 3GPP access.

26. The apparatus of claim 24, wherein the different types of access comprise at least a non-3GPP access and a 3GPP access.

27. The apparatus of claim 24, wherein the first function is a control plane function and the second function is a user plane function.

* * * * *